(12) United States Patent
Pedersen

(10) Patent No.: US 6,793,168 B1
(45) Date of Patent: Sep. 21, 2004

(54) CONDIMENT GRINDER

(76) Inventor: Bennie Peder Smiszek Pedersen, Bregentvedvej 48, Haslev (DK), 4690

( * ) Notice: Subject to any disclaimer, the term of this patent is extended or adjusted under 35 U.S.C. 154(b) by 117 days.

(21) Appl. No.: 10/242,843

(22) Filed: Sep. 12, 2002

(51) Int. Cl.[7] ................................. A47J 42/04
(52) U.S. Cl. .................................. 241/169.1
(58) Field of Search ................ 241/168, 169, 241/169.1; 222/142.1–142.7

(56) References Cited

U.S. PATENT DOCUMENTS

| | | |
|---|---|---|
| 1,547,953 A | 7/1925 | Palmer |
| 2,679,360 A | 5/1954 | Arni |
| 2,683,566 A | 7/1954 | Bentley |
| 2,698,719 A | 1/1955 | Heard |
| 2,876,956 A | 3/1959 | Bentley |
| 3,055,599 A | 9/1962 | Cowles et al. |
| 3,096,036 A | 7/1963 | Cowles et al. |
| 4,374,574 A * | 2/1983 | David ...................... 241/169.1 |
| 4,844,352 A * | 7/1989 | Griffin ...................... 241/101.2 |
| 6,672,524 B1 * | 1/2004 | Holcomb et al. ........... 241/169 |

* cited by examiner

Primary Examiner—Mark Rosenbaum
(74) Attorney, Agent, or Firm—Jack C. Munro

(57) ABSTRACT

A condiment grinder which affects grinding of a condiment by reciprocating manual lineal movement of a plunger which is mounted within a body of the condiment grinder. The plunger is part of a grinding mechanism which includes a clutch assembly that causes a shaft to rotate in only one direction regardless of whether the plunger is depressed or retracted.

8 Claims, 2 Drawing Sheets

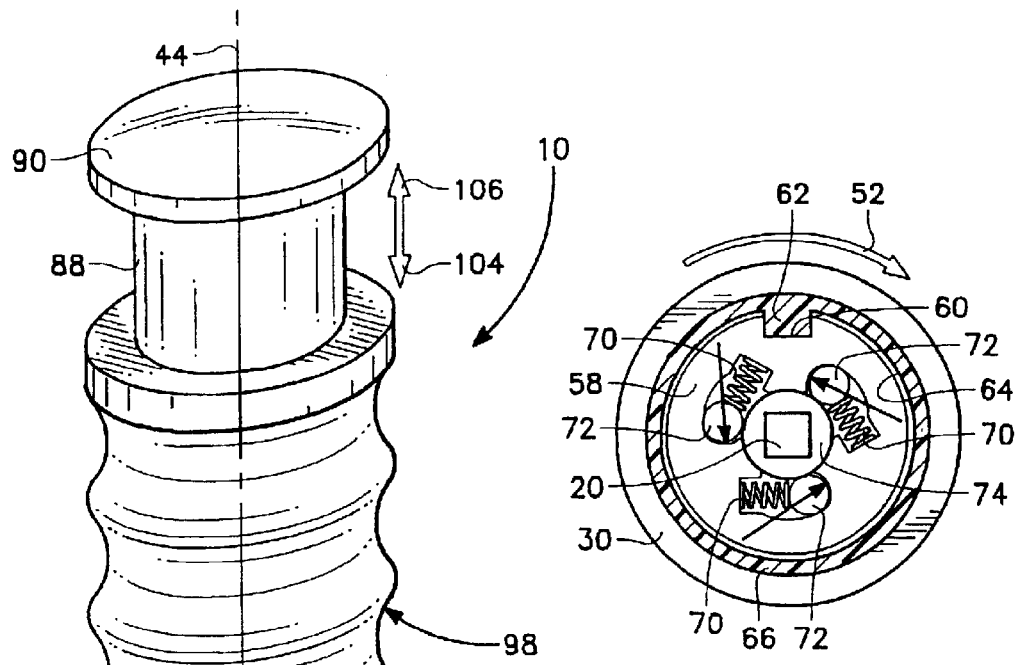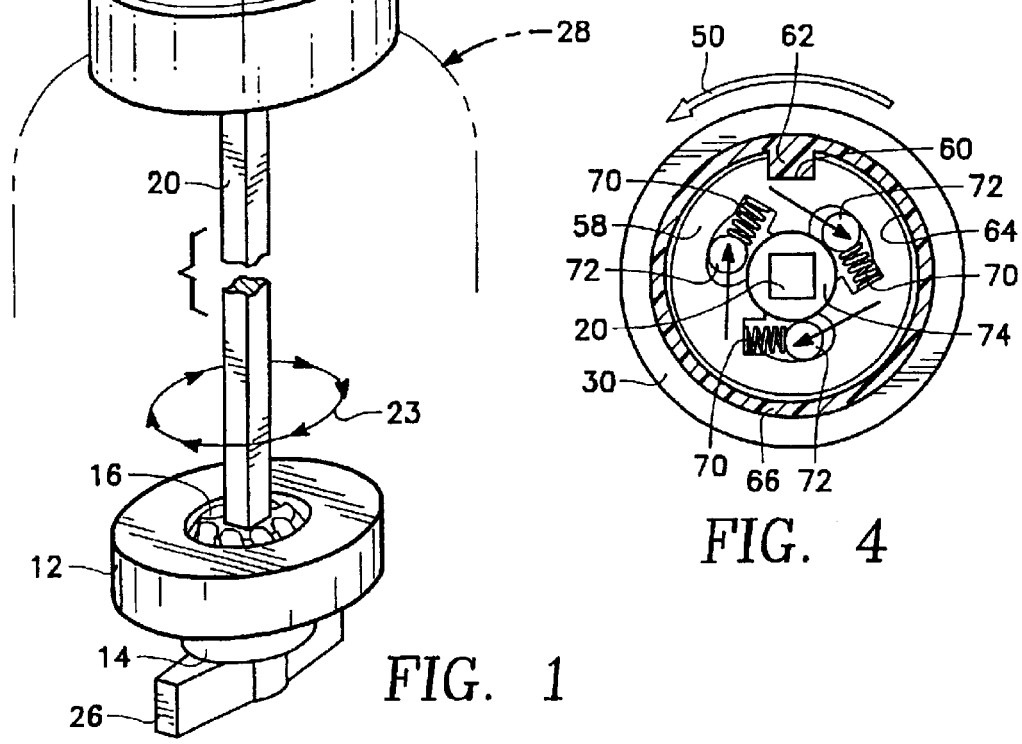

CONDIMENT GRINDER

BACKGROUND OF THE INVENTION

1. Field of the Invention

The subject matter of this invention is directed to grinders and more particularly to a condiment grinder that is designed to affect one hand grinding operation of a particulate condiment, such as pepper or salt.

2. Description of the Related Art

Handheld, manually operated condiment grinders have long been known. Such condiment grinders are designed particularly to grind whole peppercorns with the freshly ground pepper to be then distributed onto food. Also, such condiment grinders can be utilized to pulverize salt crystals. Such condiment grinders can also be used to grind in small particles other spices that are produced in a particulate form.

The most common type of pepper grinder is one which is held by one hand while the other hand rotates a crank to grind the pepper. Such pepper grinders require both hands for the operation thereof. It is desirable to have a pepper grinder to be usable with one hand which leaves the user's other hand free to perform other tasks.

In the past, it has been known to construct condiment grinders which are operable only with one hand. However, these condiment grinders of the prior art have not proved to be easily operated and especially easily operated by individuals that have a minimal amount of hand strength. Additionally, the condiment grinders of the prior art have not been easily adjustable so as to readily vary a particulate size of the condiment that is produced. Also, such condiment grinders of the prior art have not been designed to be especially attractive.

SUMMARY OF THE INVENTION

A first basic embodiment condiment grinder which utilizes a grinding wheel that rotates in conjunction with a ring. The ring is mounted on a container. The container has an internal chamber that connects with a grinding wheel. A condiment is to be supplied into the internal chamber and dispensed exteriorly of the container by rotating of the grinding wheel relative to the ring. There is utilized a grinding wheel rotation mechanism which comprises a shaft attached to the grinding wheel which extends through the internal chamber of the container. A handle sleeve, which has a hollow chamber, is mounted on the container. The shaft is located within the hollow chamber. A one-way clutch assembly is mounted on the shaft and located within the hollow chamber. The one-way clutch assembly only permits rotation of the shaft in one direction. A plunger is mounted on the handle sleeve. The plunger is movable relative to the handle sleeve between a depressed position and a retracted position. The plunger is continuously spring biased tending to locate the plunger in the retracted position. Manual movement of the plunger against the spring bias to the depressed position will cause the shaft to turn relative to the container and affect grinding and dispensing of a condiment that becomes captured between the grinding wheel and the ring.

A further embodiment of the present invention is where the first basic embodiment is modified by the shaft being polygonal shaped.

A further embodiment of the present invention is where the first basic embodiment is modified by the one-way clutch assembly being defined as including at least one first wedge member mounted within a first housing. This first wedge member is normally biased to a locked position which prevents rotation of the shaft in a clockwise direction but permits rotation of the shaft in a counterclockwise direction. A second wedge member is mounted within a second housing. The second wedge member is normally biased to a locked position to cause rotation of the shaft in the counterclockwise direction.

A further embodiment of the present invention is where the first basic embodiment is modified by the grinding wheel being mounted on the shaft by a wing nut which can be adjusted to various positions on the shaft to achieve various sizes of the particles of condiment.

A second basic embodiment of the present invention which comprises a condiment grinder which has a container which is adapted to contain a grindable condiment. A grinding assembly is mounted at a dispensing location of the container. A grinding operating mechanism is mounted on the container with this grinding operating mechanism being operable manually by lineal reciprocating movement of a plunger. The mechanism includes a clutch mechanism, the clutch mechanism permits only one direction of rotational movement of the grinding assembly regardless of the direction of movement of the plunger.

A further embodiment of the present invention is where the second basic embodiment is modified by the mechanism including a protuberance which engages with a guide slot, movement of the plunger produces a precise amount of rotation of the grinding assembly which is established by the length and configuration of the guide slot.

A further embodiment of the present invention is where the second basic embodiment is modified by the amount of the precise amount of rotation comprising thirty three degrees.

A further embodiment of the present invention is where the second basic embodiment is modified by there being a clutch. mechanism which includes a pair of spaced apart clutch units where each clutch units connects with a shaft that is connected to the grinding assembly.

A third basic embodiment of the present invention comprises a condiment grinder which includes a container that is adapted to contain a quantity of a grindable condiment. A grinding assembly is mounted at a dispensing location of the container. A grinding operating mechanism is mounted on the container. This grinding operating mechanism is operable manually by lineal reciprocating movement of a plunger. This mechanism includes a protuberance which engages with a guide slot. Movement of the plunger produces a precise amount of rotation of the grinding assembly which is established by the length and configuration of the guide slot.

A further embodiment of the present invention is where the third basic embodiment is modified by the amount of the precise amount of rotation comprising thirty three degrees.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of the condiment grinder of the present invention showing the container with which it is connected in phantom;

FIG. 3 is a cross-sectional view through a portion of the clutch mechanism included within the condiment grinder of this invention taken along lines 3—3 of FIG. 2 showing the clutch mechanism in an engaged position; and FIG. 4 is a view similar to FIG. 3 but showing the clutch mechanism in an exaggerated disengaged position which will permit pivoting of the shaft included within the condiment grinder of this invention.

DETAILED DESCRIPTION OF THE INVENTION

Figure 2:
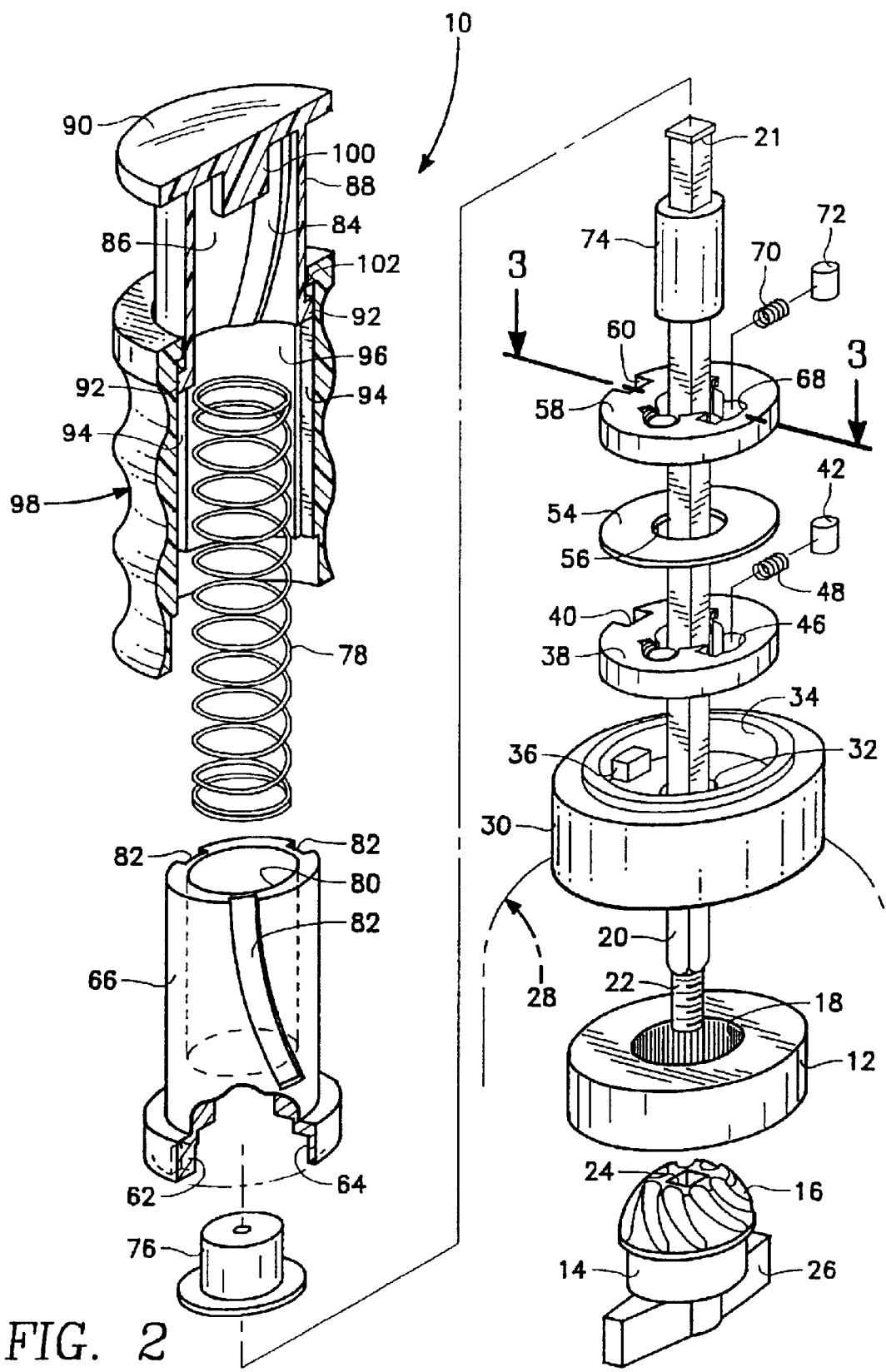
FIG. 2 is an exploded isometric view of the condiment grinder of this invention again showing the container in phantom.

Referring particularly to the drawings, there is shown the condiment grinder 10 of this invention. Condiment grinder 10 includes a grinding mechanism which comprises a ring 12 and a grinding wheel 14. The grinding wheel 14 has an external milling surface 16. The ring 12 has an internal milling surface 18. A shaft 20, which has an outer threaded end 22, is to be extended through center hole 24 formed entirely through the grinding wheel 14. The outer threaded end 22 is to connect with a wing nut 26.

The ring 12 is fixedly mounted at the bottom of a container 28. The container 28 has an internal compartment, which is not shown, within which is to be supplied a quantity of a particulate condiment, such as pepper. The shaft 20 is of a polygonal configuration with generally square being preferred. The polygonal shaped shaft 20 is to be conducted through a polygonal shaped center hole 24. Therefore, as the shaft 20 is turned, so also is the grinding wheel 14. The wing nut 26 can be tightened or loosened relative to the grinding wheel 14 which will vary the spacing between the external milling surface 16 and the internal milling surface 18. If this spacing is small, then small size particles will be dispensed past the wing nut 26 when the condiment grinder 10 of this invention is being operated. If this spacing is larger, then larger size particulate condiment matter will be dispensed.

Fixedly mounted on the upper end of the container 28 is a collar 30. The shaft 20 passes through center hole 32 formed in the collar 30. Center hole 32 will be circular so there is no driving connection between the collar 30 and the shaft 20. The collar 30 includes an annular recess 34. Mounted within the annular recess 34 is a key 36. A disc housing 38 is to matingly fit within the annular recess 34. The disc housing 38 has a peripheral notch 40. The key 36 is to be located within the peripheral notch 40 to establish a rotatably fixed relationship preventing pivoting between collar 30 and disc housing 38.

Mounted within the disc housing 38 are three in number of pins 42 which are equiangularly spaced apart relative to the longitudinal center axis 44 of the condiment grinder 10. Each of the pins 42 are basically short cylindrical members. The center axis of each pin 42 is located parallel to the longitudinal center axis 44 of the condiment grinder 10. Each pin 42 is mounted within a cutout 46 formed within the disc housing 38. Also mounted within each cutout 46 is a coil spring 48. It is to be understood that there is a separate coil spring 48 for each pin 42. The arrangement of the pins 42 and the coil springs 48 is such that each pin 42 is continuously biased in a counterclockwise direction, which is represented by arrow 50 in FIG. 4. The result is each of the pins 42 functions as a wedging member that is pressed by the coil springs 48 into tight engagement with a sleeve 74 which is fixed on shaft 20. In essence, disc housing 38, coil springs 48 and pins 42 function as a clutch mechanism that will prevent rotation of the shaft 20 in a counterclockwise direction but will permit the shaft 20 to rotate in a clockwise direction. The clockwise direction is represented by arrow 52 in FIG. 3.

Mounted against the disc housing 38 is a plastic washer 54. The shaft 20 passes through center hole 56 formed in the plastic washer 54. Typically, the plastic washer 54 will be constructed of a low frictional type of plastic. Such a plastic is commonly sold under the trade name of Teflon. The washer 54 functions as a spacer to separate disc housing 38 from a similarly constructed disc housing 58. The disc housing 58 also includes a peripheral notch 60 which is to engage with a key 62. The key 62 is formed on the wall surface of an internal opening 64 of a movable sleeve 66. The disc housing 58 is therefor rotationally locked to movable sleeve 66. The disc housing 58 also includes three in number of cutouts 68, and within each cutout 68 is mounted a coil spring 70 and a pin 72. The springs 70 are essentially identical to springs 48 and pins 72 are essentially identical to pins 42. The function of the disc housing 58 in conjunction with the pins 72 and the coil springs 70 is to apply a wedging force with the wedge members comprising the pins 72 which are forced tightly into contact with the exterior surface of the fixed sleeve 74. Since the disc housing 58 is carried by the movable sleeve 66, the shaft 20 is thereby locked to the movable sleeve 66 when the movable sleeve 66 is turned in the clockwise direction, represented by arrow 52 in FIG. 3. However, when the movable sleeve 66 is turned slightly in the counterclockwise direction, represented by arrow 50 in FIG. 4, the pins 72 will be slightly unseated and will be disengaged slightly from a fixed sleeve 74 which is fixedly mounted on the shaft 20. This will permit the movable sleeve 66 to be moved in the counterclockwise direction carrying with it the disc housing 58. The disc housings 58 and 38 constitute the clutch mechanism that is used in conjunction with the condiment grinder 10 of this invention. Shaft 20 terminates at its upper end in a head plate 21.

The fixed sleeve 74 is of such a length that both pins 72 and 42 are to wedgingly connect with the sleeve 74 as opposed to connecting directly with the shaft 20. It is preferred that a round cylindrical surface be used for engagement in conjunction with the pins 72 and 42 which provides a better connection.

Mounted within the internal opening 64 is a spring retainer 76. A main coil spring 78 is to be located within internal chamber 80 of the movable sleeve 66. The internal chamber 80 constitutes a through opening extending entirely through the movable sleeve 66. One end of the main coil spring 78 is to be held in place by the spring retainer 76.

Formed on the peripheral surface of the movable sleeve 66 are three in number of equiangularly spaced apart, basically identical in shape, grooves 82. Each of the grooves 82 is slightly curved, that is, not in alignment with the longitudinal center axis 44. Each groove 82 is to permanently connect with a similarly curved ridge 84 which is mounted on the wall surface 86 of an internal chamber of a plunger 88. It is to be understood that there is a separate ridge 84 for each groove 82. The upper end of the plunger 88 is closed by an enlarged head 90. The end of the plunger 88 located opposite the enlarged head 90 includes a pair of diametrically spaced apart protuberances 92. Each protuberance 92 connects with a lineal groove 94 with there being a pair of lineal grooves 94 being diametrically spaced apart relative to hollow chamber 96 formed within a handle sleeve 98. Hollow chamber 96 extends entirely through a handle sleeve 98. The exterior wall of the handle sleeve 98 has a smoothly contoured wavy configuration which facilitates connection to a user's hand.

Attached to the enlarged head 90 and extending within the internal chamber of the plunger 88 is a spring seat 100. The outer end of the main spring 78 is to be located about the spring seat 100 which means that the main spring 78 is continuously in a captured position between the enlarged head 90 and the spring retainer 76. The handle sleeve 98 includes an inwardly extending annular member 102 which functions to keep the plunger 88 mounted in conjunction with the handle sleeve 98 since the protuberances 92 will come into contact with the annular member 102 and prevent separation of the plunger 88 from the handle sleeve 98.

Let it be assumed that there is condiment contained within the container 28 and the desired position of the wing nut 26 has been established determining the size of the particulates of the condiment that will be produced. The user places the condiment grinder 10 of this invention in one hand with the hand and the fingers being located in the area of the exterior surface of the handle sleeve 98. The user's thumb can then be placed against the enlarged head 90 and exert a downward force in the direction of arrow 104, as shown in FIG. 1. As a result, the plunger 88 will be moved lineally downward in a direction parallel to the longitudinal center axis 44 since the lineal grooves 94 are located parallel to longitudinal center axis 44. The protuberances 92 will slide downward within the grooves 94 compressing of spring 78. As the ridges 84 ride within the grooves 82, because the grooves 82 are arcuate the movable sleeve 66 is turned with the amount of this turning being approximately thirty-three degrees. When the movable sleeve 66 is turned so also is disc housing 58 because of the keying arrangement between the key 62 and the peripheral notch 60. Because the pins 72 are wedged tightly against the fixed sleeve 74, the shaft 20 is then turned which also turns the grinding wheel 14 affecting grinding of the condiment located between the exterior milling surface 16 and the interior milling surface 18. After the condiment is ground, it is then dispensed exteriorly of the condiment grinder 10 past the wing nut 26.

When the user allows the plunger 88 to move in an upward direction in the direction of arrow 106, the main spring 78 becomes extended. The ridges 84 again move within the grooves 82 with the result that the movable sleeve 66 pivots about thirty-three degrees in the opposite direction which places the movable sleeve 66 back in its initial position. The movable sleeve 66 is pivoted counterclockwise. Also, the disc housing 58 is pivoted counterclockwise. The disc housing 58 and the pins 72 slip relative to the fixed sleeve 74. The disc housing 38 and the pins 42 hold fast and keep the shaft 20 from pivoting in the counterclockwise direction. When the enlarged head 90 is in the completely up position, the procedure is again to be repeated with the result that the shaft 20 will again pivot a further thirty-three degrees. With each thirty-three degree movement, which is depicted by arrow 23, a portion of the condiment is ground and dispensed.

What is claimed is:

1. A condiment grinder comprising:
   a grinding wheel that rotates relative to and in conjunction with a ring, said ring being mounted on a container, said container has an internal chamber that connects with said grinding wheel, whereby a condiment is to be supplied into said internal chamber and dispensed exteriorly of said container by rotating said grinding wheel relative to said ring;
   a grinding wheel rotation mechanism comprising:
   a shaft attached to said grinding wheel and extending through said internal chamber, a handle sleeve having a hollow chamber mounted on said container, said shaft being located within said hollow chamber, a one-way clutch assembly mounted on said shaft and located within said hollow chamber, said one-way clutch assembly only permitting rotation of said shaft in one direction, a plunger mounted on said handle sleeve, said plunger being lineally movable relative to said handle sleeve between a depressed position and a retracted position, said plunger being lineally movable in a direction parallel to a longitudinal axis of said shaft, said plunger being continuously spring biased tending to locate said plunger in said retracted position, manual lineal movement of said plunger against the spring bias to said depressed position causes said shaft to turn relative to said container and affect grinding and dispensing of a condiment that becomes captured between said grinding wheel and said ring.

2. The condiment grinder as defined in claim 1 wherein:
   said shaft being polygonal shaped, said grinding wheel having a polygonal shaped opening, said polygonal shaped shaft matingly connecting within said polygonal shaped opening.

3. The condiment grinder as defined in claim 1 wherein:
   said grinding wheel being mounted on said shaft by a wing nut which threadingly engages with said shaft, said wing nut being adjustable to various positions in order to achieve variance of the size of the particles that are produced when pulverizing the condiment.

4. A condiment grinder comprising:
   a grinding wheel that rotates relative to and in conjunction with a ring, said ring being mounted on a container, said container has an internal chamber that connects with said grinding wheel, whereby a condiment is to be supplied into said internal chamber and dispensed exteriorly of said container by rotating said grinding wheel relative to said ring;
   a grinding wheel rotation mechanism comprising:
   a shaft attached to said grinding wheel and extending through said internal chamber, a handle sleeve having a hollow chamber mounted on said container, said shaft being located within said hollow chamber, a one-way clutch assembly mounted on said shaft and located within said hollow chamber, said one-way clutch assembly only permitting rotation of said shaft in one direction, a plunger mounted on said handle sleeve, said plunger being movable relative to said handle sleeve between a depressed position and a retracted position, said plunger being continuously spring biased tending to locate said plunger in said retracted position, manual movement of said plunger against the spring bias to said depressed position causes said shaft to turn relative to said container and affect grinding and dispensing of a condiment that becomes captured between said grinding wheel and said ring; and
   said one-way clutch assembly including at least one first wedge member mounted within a first housing, said first wedge member being normally biased to a locked position which prevents rotation of said shaft in a clockwise direction but permits rotation of said shaft in a counterclockwise direction, a second wedge member mounted within a second housing, said second wedge member being normally biased to a locked position to permit rotation of said shaft in said counterclockwise direction.

5. A condiment grinder comprising:

a container adapted to contain a grindable condiment;

a grinding assembly mounted at a dispensing location of said container;

a grinding mechanism mounted on said container, said mechanism being operable manually by lineal reciprocating movement of a plunger, said grinding mechanism including a clutch mechanism, said clutch mechanism permits only one direction of rotational movement of said grinding assembly regardless of the direction of movement of said plunger; and said grinding mechanism includes a protuberance which engages with a guide slot, movement of said plunger produces a precise amount of rotation of said grinding assembly which is established by the length and configuration of said guide slot, said precise amount of rotation comprising a segment of a circle.

6. The condiment grinder defined in claim 5 wherein:

said precise amount of rotation comprising thirty three degrees.

7. A condiment grinder comprising:

a container adapted to contain a grindable condiment;

a grinding assembly mounted at a dispensing location of said container;

a grinding mechanism mounted on said container, said grinding mechanism being operable manually by lineal reciprocating movement of a plunger, said grinding mechanism including a protuberance which engages with a guide slot, movement of said plunger produces a precise amount of rotation of said grinding assembly which is established by the length and configuration of said guide slot.

8. The condiment grinder as defined in claim 7 wherein:

said precise amount of rotation comprising thirty three degrees.

* * * * *